United States Patent
Moe et al.

(10) Patent No.: US 12,326,113 B2
(45) Date of Patent: Jun. 10, 2025

(54) SEGMENTED NACELLE INLET LIP WITH ELECTRIC ANTI-ICING SYSTEM

(71) Applicant: Rohr, Inc., Chula Vista, CA (US)

(72) Inventors: Jeffrey W. Moe, Chula Vista, CA (US); John E. Van Doren, San Diego, CA (US); Aleksandar Ratajac, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/231,578

(22) Filed: Aug. 8, 2023

(65) Prior Publication Data

US 2025/0052195 A1  Feb. 13, 2025

(51) Int. Cl.
*F02C 7/047* (2006.01)
*B64D 29/00* (2006.01)

(52) U.S. Cl.
CPC .............. *F02C 7/047* (2013.01); *B64D 29/00* (2013.01)

(58) Field of Classification Search
CPC ........ B64D 15/12; B64D 15/00; B64D 15/14; F02C 7/047; F02C 7/28
See application file for complete search history.

(56) References Cited

U.S. PATENT DOCUMENTS

| | | | |
|---|---|---|---|
| 7,469,862 B2 | 12/2008 | Layland | |
| 7,513,458 B2 | 4/2009 | Layland | |
| 7,923,668 B2 | 4/2011 | Layland | |
| 8,740,137 B2 | 6/2014 | Vauchel | |
| 9,102,413 B2 | 8/2015 | Porte | |
| 9,403,599 B2 | 8/2016 | Binks et al. | |
| 9,567,905 B2 | 2/2017 | Porte | |
| 10,160,552 B2 * | 12/2018 | Crawford | F02C 7/04 |
| 11,008,109 B2 | 5/2021 | Khuong et al. | |
| 11,414,203 B2 * | 8/2022 | Sanz Martinez | B64D 33/02 |
| 2005/0006529 A1 | 1/2005 | Moe et al. | |

(Continued)

FOREIGN PATENT DOCUMENTS

FR   2836182 B1   10/2005

OTHER PUBLICATIONS

EP Search Report for EP Patent Application No. 24193548.5 dated Nov. 18, 2024.

(Continued)

*Primary Examiner* — Thuyhang N Nguyen
(74) *Attorney, Agent, or Firm* — Getz Balich LLC

(57) ABSTRACT

An assembly for an aircraft propulsion system includes a nacelle inlet structure. The nacelle inlet structure includes an inlet lip, an inner barrel, an outer barrel, a bulkhead and a plurality of structure segments. Each of the structure segments includes an exterior skin, an inner mount flange, an outer mount flange and an electric heater configured to heat the exterior skin. The exterior skin forms at least a respective circumferential section of the inlet lip. The inner mount flange is connected to and projects radially outward away from the exterior skin. An inner fastener extends axially through the inner mount flange and couples the inner mount flange to the inner barrel. The outer mount flange is connected to and projects radially inward away from the exterior skin. An outer fastener extends axially through the outer mount flange and couples the outer mount flange to the bulkhead.

20 Claims, 14 Drawing Sheets

(56) References Cited

U.S. PATENT DOCUMENTS

| | | | |
|---|---|---|---|
| 2006/0145001 A1* | 7/2006 | Smith | B64D 29/06 |
| | | | 244/110 B |
| 2006/0237582 A1 | 10/2006 | Layland | |
| 2009/0134272 A1 | 5/2009 | Vauchel | |
| 2012/0126062 A1 | 5/2012 | Stewart, III | |
| 2016/0114898 A1* | 4/2016 | Llamas Castro | F02C 7/047 |
| | | | 415/177 |
| 2016/0377090 A1 | 12/2016 | Brown | |
| 2019/0291878 A1 | 9/2019 | Kestler | |
| 2020/0017191 A1 | 1/2020 | Porte et al. | |
| 2020/0017222 A1* | 1/2020 | Khuong | B64D 15/20 |
| 2020/0290747 A1 | 9/2020 | Delsol | |
| 2022/0041295 A1 | 2/2022 | Ferrier | |
| 2023/0167774 A1* | 6/2023 | Schrell | B32B 7/12 |
| | | | 415/119 |
| 2024/0367802 A1 | 11/2024 | Sherman | |

OTHER PUBLICATIONS

EP Search Report for EP Patent Application No. 24193602.0 dated Nov. 27, 2024.
EP Search Report for EP Patent Application No. 24193683.0 dated Nov. 12, 2024.
EP Search Report for EP Patent Application No. 24193695.4 dated Feb. 5, 2025.

* cited by examiner

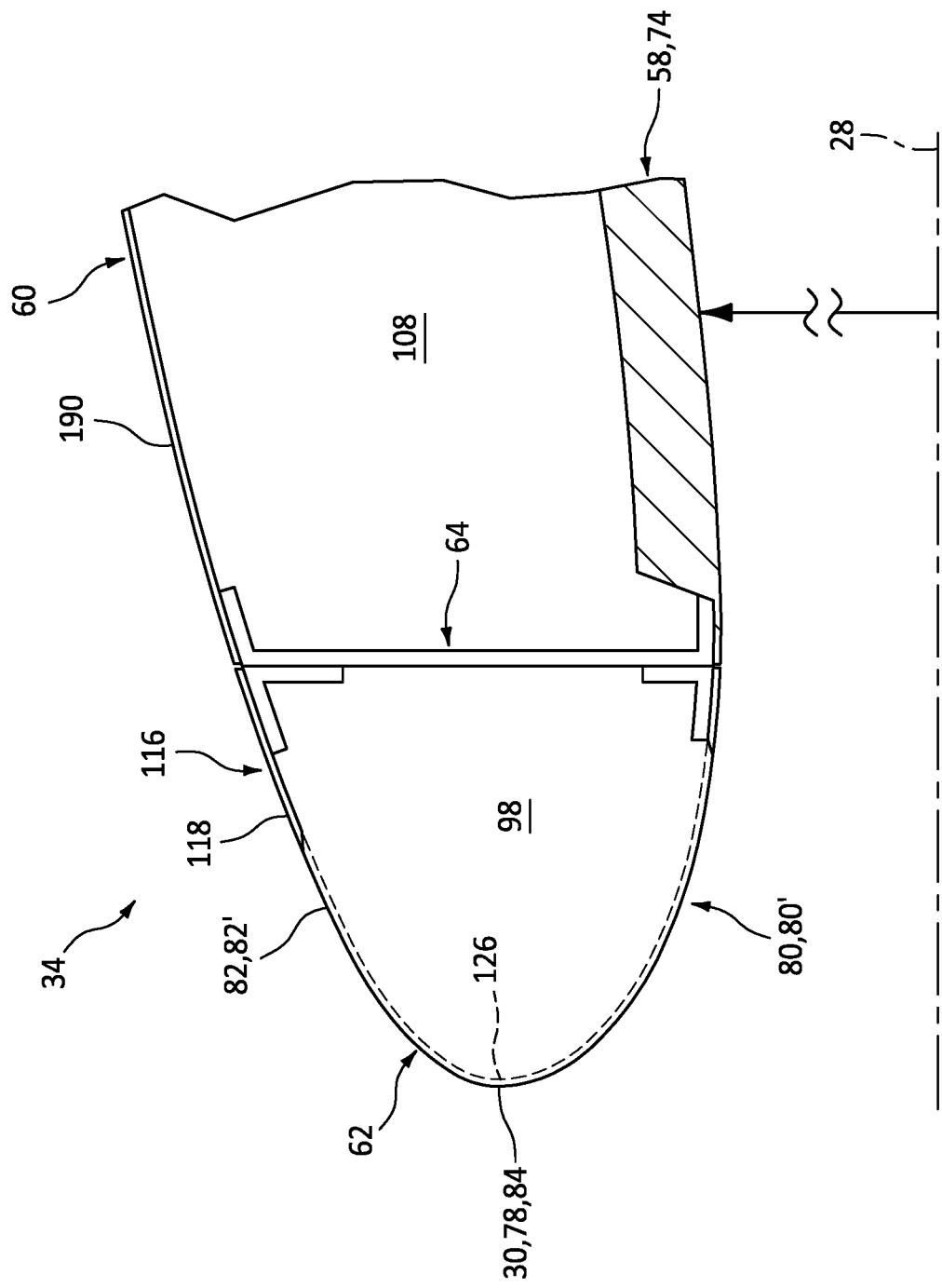

SEGMENTED NACELLE INLET LIP WITH ELECTRIC ANTI-ICING SYSTEM

BACKGROUND

1. Technical Field

This disclosure relates generally to an aircraft propulsion system and, more particularly, to a nacelle inlet structure with, for example, an electric anti-icing system.

2. Background Information

A nacelle for an aircraft propulsion system may include an electric anti-icing system for reducing/preventing ice accumulation on an inlet lip of the nacelle. Various types and configurations of anti-icing systems as well as inlet lips are known in the art. While these known anti-icing systems and inlet lips have various benefit, there is still room in the art for improvement.

SUMMARY OF THE DISCLOSURE

According to an aspect of the present disclosure, an assembly is provided for an aircraft propulsion system. This assembly includes a nacelle inlet structure which extends axially along and circumferentially around a centerline. The nacelle inlet structure includes an inlet lip, an inner barrel, an outer barrel, a bulkhead and a plurality of structure segments. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. The bulkhead is connected to the inner barrel. Each of the structure segments includes an exterior skin, an inner mount flange, an outer mount flange and an electric heater configured to heat the exterior skin. The exterior skin forms at least a respective circumferential section of the inlet lip. The inner mount flange is connected to and projects radially outward away from the exterior skin. An inner fastener extends axially through the inner mount flange and couples the inner mount flange to the inner barrel. The outer mount flange is connected to and projects radially inward away from the exterior skin. An outer fastener extends axially through the outer mount flange and couples the outer mount flange to the bulkhead.

According to another aspect of the present disclosure, another assembly is provided for an aircraft propulsion system. This assembly includes a nacelle inlet structure which extends axially along and circumferentially around a centerline. The nacelle inlet structure includes an inlet lip, an inner barrel, an outer barrel, a bulkhead and a plurality of structure segments. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. Each of the structure segments includes an exterior skin, an inner mount flange, an outer mount flange and an electric heater configured to heat the exterior skin. The exterior skin forms at least a respective circumferential section of the inlet lip. The inner mount flange is connected to and projects radially outward away from the exterior skin. An inner fastener extends axially through the inner mount flange and the bulkhead. The outer mount flange is connected to and projects radially inward away from the exterior skin. An outer fastener extends axially through the outer mount flange and the bulkhead.

According to still another aspect of the present disclosure, another assembly is provided for an aircraft propulsion system. This assembly includes a nacelle inlet structure and a fan cowl. The nacelle inlet structure extends axially along and circumferentially around a centerline. The nacelle inlet structure includes an inlet lip, an inner barrel, an outer barrel, a forward bulkhead and an aft bulkhead. The inner barrel projects axially aft away from an inner lip portion of the inlet lip. The outer barrel projects axially aft away from an outer lip portion the inlet lip. The outer barrel is radially outboard of and axially overlaps the inner barrel. The forward bulkhead is connected to the inner barrel and the outer lip portion of the inlet lip. The aft bulkhead is connected to and projects radially outward away from the inner barrel. The fan cowl axially overlaps and radially engages the forward bulkhead and the aft bulkhead.

The bulkhead may be a forward bulkhead. The nacelle inlet structure may also include an aft bulkhead connected to and projecting radially out away from the inner barrel. The exterior skin may also form a respective circumferential section of the outer barrel. The outer mount flange may be a forward outer mount flange. Each of the structure segments may also include an aft outer mount flange mechanically fastened to the aft bulkhead.

An outer barrel fastener may project through the outer barrel and a flange of the bulkhead to mechanically fasten the outer barrel to the bulkhead.

The structure segments may be arranged circumferentially side-by-side around the centerline in an array to collectively form the inlet lip.

The exterior skin may also form a respective circumferential section of the outer barrel.

The inner fastener may include a bolt threaded into a nut. The inner mount flange may be secured axially between the nut and a head of the bolt.

The inner fastener may be configured as or otherwise include a pin projecting axially through a fastener aperture in the inner mount flange.

The inner fastener may project axially out from a mount for the inner barrel and extend axially through a fastener aperture in the inner mount flange.

The inner fastener may project axially out from the bulkhead and extend axially through a fastener aperture in the inner mount flange.

The inner mount flange may be formed integral with the exterior skin.

An inner mount may include the inner mount flange. The inner mount may be bonded to the exterior skin.

The outer fastener may include a bolt threaded into a nut. The outer mount flange may be secured axially between the nut and a head of the bolt.

The outer fastener may project axially out from the bulkhead and extend axially through a fastener aperture in the outer mount flange.

The outer mount flange may be formed integral with the exterior skin.

An outer mount may include the outer mount flange. The outer mount may be bonded to the exterior skin.

The bulkhead may be a forward bulkhead. The inner fastener may also extend axially through the forward bulkhead. The nacelle inlet structure may also include an aft bulkhead connected to the inner barrel. The outer mount flange may be a forward outer mount flange. Each of the structure segments may also include an aft outer mount flange connected to and projecting radially inward away from the exterior skin. The outer fastener may be a forward outer fastener. An aft outer fastener may extend axially through the aft outer mount flange and couple the aft outer mount flange to the aft bulkhead.

The assembly may also include a fan cowl axially overlapping and radially engaging the bulkhead.

The bulkhead may be a forward bulkhead. The nacelle inlet structure may also include an aft bulkhead connected to the inner barrel. The fan cowl may axially overlap and radially engage the aft bulkhead.

The exterior skin may be configured from or otherwise include metal.

The exterior skin may be configured from or otherwise include fiber-reinforced composite material.

The electric heater may be connected to the exterior skin along an interior surface of the exterior skin.

The electric heater may be integrated with the exterior skin.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 13 and 14 are partial sectional illustrations of the nacelle inlet structure with various bulkhead and exterior skin arrangements.

DETAILED DESCRIPTION

Figure 1:
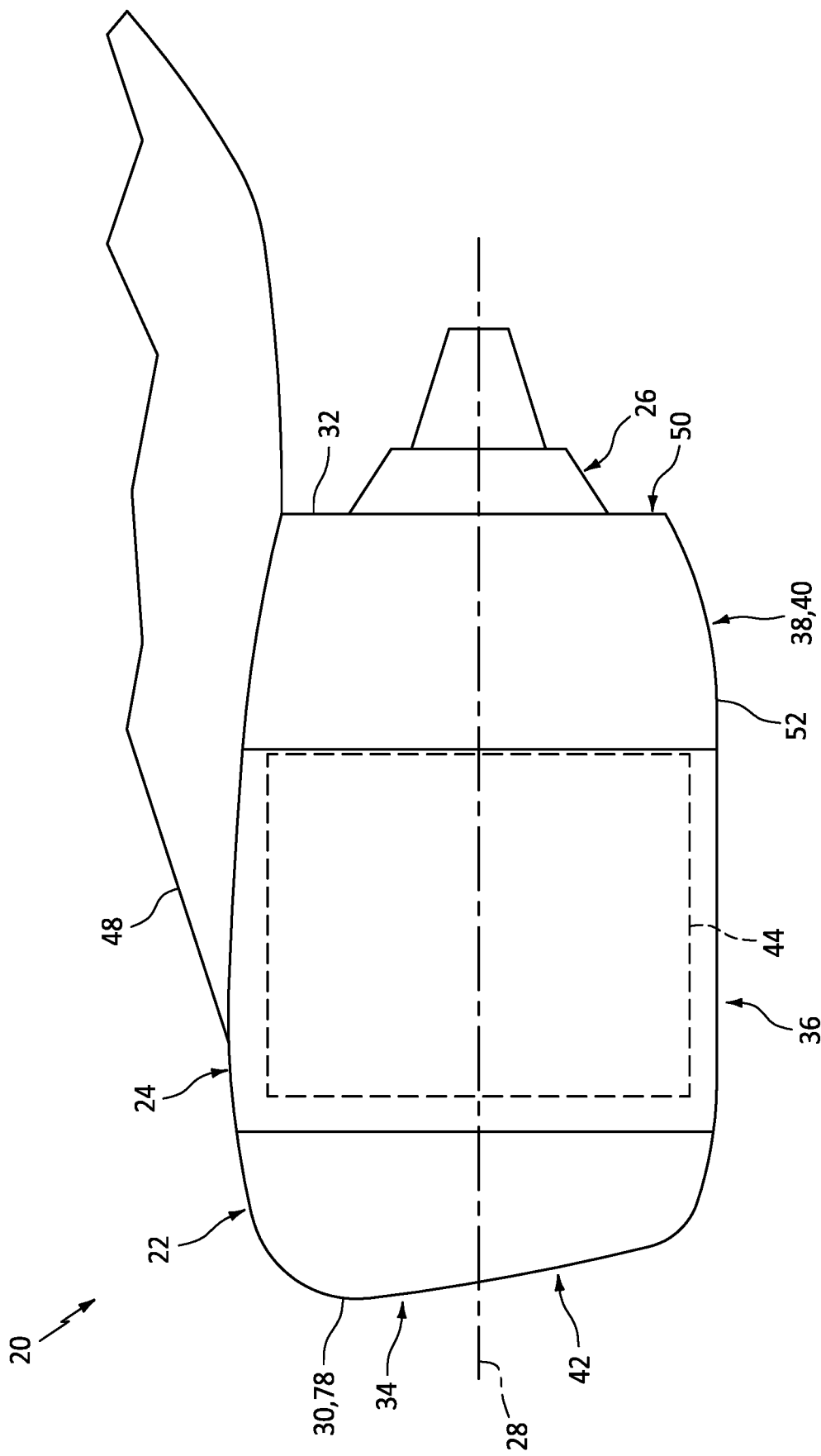
FIG. 1 is a side illustration of an aircraft propulsion system with a pylon.

FIG. 1 illustrates an aircraft propulsion system 20 for an aircraft such as, but not limited to, a commercial airliner or a cargo plane. The aircraft propulsion system 20 includes a nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight.

The nacelle 22 is configured to house and provide an aerodynamic cover for the gas turbine engine. The nacelle 22 of FIG. 1, for example, includes a nacelle outer structure 24 and a nacelle inner structure 26; e.g., an inner fixed structure (IFS).

The outer structure 24 extends axially along an axial centerline 28 between an upstream, forward end 30 of the nacelle 22 and its outer structure 24 and a downstream, aft end 32 of the outer structure 24. Briefly, the axial centerline 28 may be a centerline axis of the nacelle 22 and/or the gas turbine engine, and/or a rotational axis for one or more rotating components (e.g., spools) of the gas turbine engine. The outer structure 24 of FIG. 1 includes a nacelle inlet structure 34, one or more nacelle fan cowls 36 (one cowl visible in FIG. 1) and a nacelle aft structure 38, which nacelle aft structure 38 may be configured as part of or include a thrust reverser system 40. The aircraft propulsion system 20, however, may be configured without the thrust reverser system 40 in other embodiments.

The inlet structure 34 is disposed at the nacelle forward end 30. The inlet structure 34 is configured to direct a stream of air through an inlet opening 42 (see also FIG. 2) at the nacelle forward end 30 into the aircraft propulsion system 20 and towards a fan section of the gas turbine engine.

The fan cowls 36 are disposed axially between the inlet structure 34 and the aft structure 38. Each fan cowl 36 of FIG. 1, in particular, is disposed at an aft end of a stationary portion of the nacelle 22, and each fan cowl 36 extends forward to the inlet structure 34. Each fan cowl 36 is generally axially aligned with the fan section of the gas turbine engine. The fan cowls 36 are configured to provide an aerodynamic covering for a fan case 44, which fan case 44 circumscribes a fan rotor within the fan section and may partially form an outer peripheral boundary of a flowpath 46 (see FIG. 2) of the aircraft propulsion system 20.

The term "stationary portion" is used above to describe a portion of the nacelle 22 that is stationary during propulsion system operation (e.g., during aircraft takeoff, aircraft flight and aircraft landing). However, the stationary portion may be otherwise movable for inspection/maintenance of the aircraft propulsion system 20; e.g., when the aircraft propulsion system 20 is non-operational. Each of the fan cowls 36, for example, may be configured to provide access to components of the gas turbine engine such as the fan case 44 and/or peripheral equipment arranged with the fan case 44 for inspection, maintenance and/or otherwise. In particular, each of the fan cowls 36 may be pivotally mounted with the aircraft propulsion system 20 (e.g., to a pylon structure 48) by, for example, a pivoting hinge system. The present disclosure, however, is not limited to the foregoing fan cowl configurations and/or access schemes.

The aft structure 38 of FIG. 1 is disposed at the structure aft end 32. The aft structure 38 is configured to form a bypass exhaust 50 for a bypass flowpath with the inner structure 26. The aft structure 38 may include one or more translating sleeves 52 (one sleeve visible in FIG. 1) for the thrust reverser system 40. The present disclosure, however, is not limited to such a translating sleeve thrust reverser system.

Figure 2:
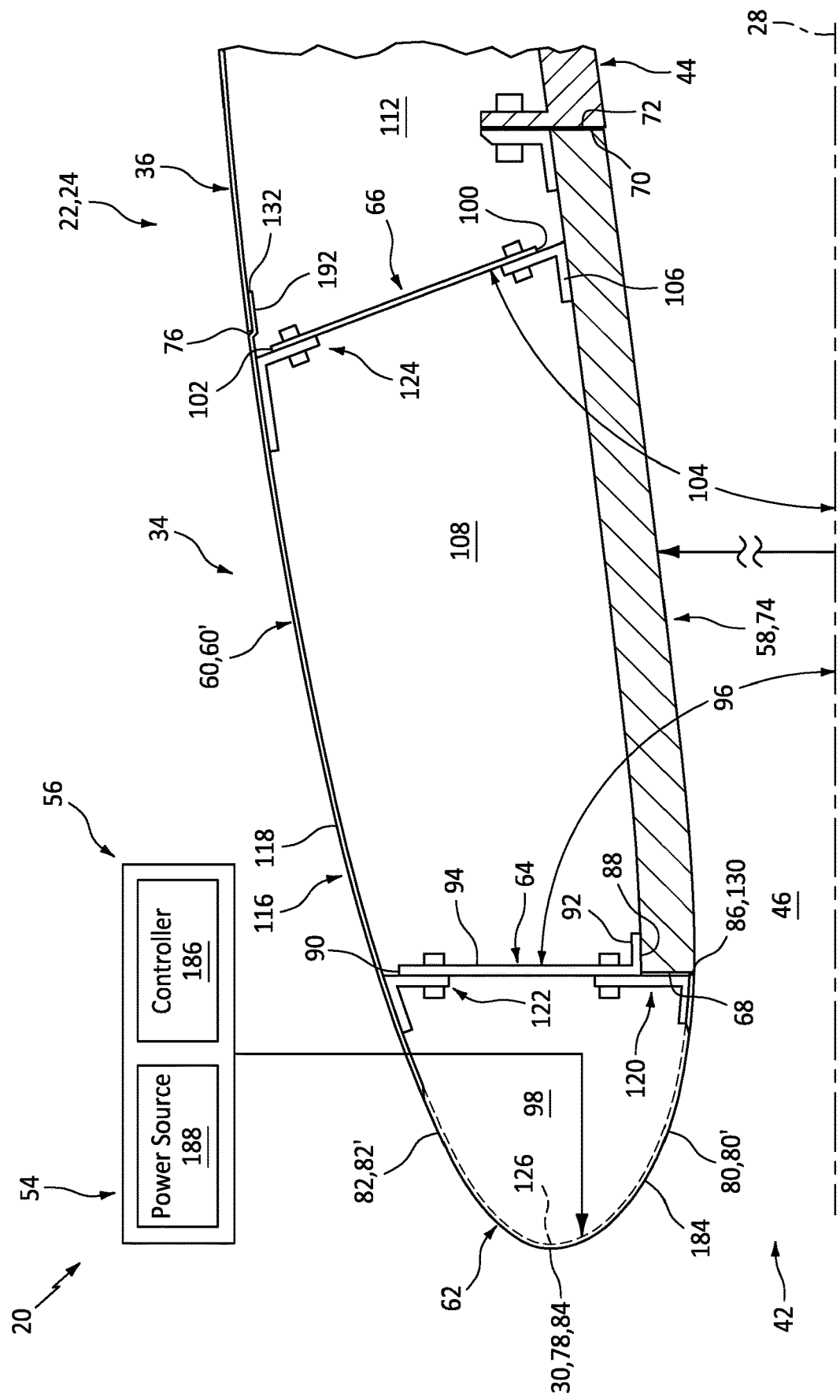
FIG. 2 is a partial sectional illustration of the propulsion system at a nacelle inlet structure with an electric anti-icing system.

FIG. 2 illustrates an assembly 54 for the aircraft propulsion system 20. This propulsion system assembly 54 includes the inlet structure 34, the fan cowls 36 (one cowl visible in FIG. 2) and the fan case 44. The propulsion system assembly 54 also includes an electric anti-icing system 56.

The inlet structure 34 of FIG. 2 includes an inner barrel 58, an outer barrel 60, an inlet lip 62 (e.g., a nose lip), and one or more bulkheads 64 and 66. The inlet structure 34 of FIG. 2 also includes one or more components of the anti-icing system 56.

The inner barrel 58 extends axially along the axial centerline 28 from an upstream, forward end 68 of the inner barrel 58 to a downstream, aft end 70 of the inner barrel 58. The inner barrel 58 extends circumferentially about (e.g., completely around) the axial centerline 28. The inner barrel 58 may thereby have a full-hoop (e.g., tubular) geometry. At (e.g., on, adjacent or proximate) the inner barrel aft end 70, the inner barrel 58 of FIG. 2 is mechanically fastened and/or otherwise attached to the fan case 44 at an upstream, forward end 72 of the fan case 44.

The inner barrel 58 may be configured to attenuate sound (e.g., noise) generated during operation of the aircraft propulsion system 20 and, more particularly for example, sound generated by rotation of the fan rotor within the fan section. The inner barrel 58 of FIG. 2, for example, includes at least one tubular acoustic panel 74 or an array of arcuate acoustic panels 74 arranged circumferentially about the axial centerline 28. Each acoustic panel 74 may include a cellular (e.g., honeycomb) core bonded to and radially between a perforated face sheet and a non-perforated back sheet, where the perforated face sheet faces radially inward and forms an outer peripheral boundary for an axial portion of the flowpath 46. Of course, various other acoustic panel types and configurations are known in the art, and the present disclosure is not limited to any particular ones thereof.

The outer barrel 60 extends axially along the axial centerline 28 to a downstream, aft end 76 of the outer barrel 60. The outer barrel 60 extends circumferentially about (e.g., completely around) the axial centerline 28. The outer barrel 60 may thereby have a full-hoop (e.g., tubular) geometry. The outer barrel 60 is spaced radially outboard of and axially overlaps the inner barrel 58. The outer barrel 60 thereby circumscribes the inner barrel 58. The outer barrel 60 of FIG. 2 is also radially outboard of and axially overlaps at least a portion or an entirety of each of the bulkheads 64 and 66. The outer barrel 60 thereby circumscribes each of the bulkheads 64 and 66. At or near the outer barrel aft end 76, the outer barrel 60 may be (e.g., removably) mechanically attached to and supported by the aft bulkhead 66 as described below in further detail.

The inlet lip 62 forms a leading edge 78 of the nacelle 22 as well as the inlet opening 42 into the aircraft propulsion system 20 (see FIG. 1), where the leading edge 78 is located at the nacelle forward end 30. The inlet lip 62 has a cupped (e.g., generally U-shaped or V-shaped or J-shaped) cross-sectional geometry which extends circumferentially around the axial centerline 28. The inlet lip 62 includes an inner lip portion 80 and an outer lip portion 82.

The inner lip portion 80 extends longitudinally (e.g., radially inwards towards and/or axially along the axial centerline 28) from an intersection 84 with the outer lip portion 82 at the leading edge 78 to an inner downstream, aft end 86 ("inner aft end") of the inlet lip 62 and its inner lip portion 80. The inner lip portion 80 extends circumferentially about (e.g., completely around) the axial centerline 28. The inner lip portion 80 may thereby have a full-hoop (e.g., annular and/or tubular) geometry. The inlet lip inner aft end 86 is disposed axially adjacent the inner barrel forward end 68. At the inlet lip inner aft end 86, the inlet lip 62 and its inner lip portion 80 may be (e.g., removably) mechanically attached to and supported by the inner barrel 58 and/or the forward bulkhead 64 as described below in further detail.

The outer lip portion 82 extends longitudinally (e.g., radially outwards away and/or axially along the axial centerline 28) from the intersection 84 with the inner lip portion 80 at the leading edge 78 to the outer barrel 60. As the outer lip portion 82 extends axially towards (e.g., to) the outer barrel 60, the outer lip portion 82 axially overlaps and diverges radially away from (in a radial outward direction away from the axial centerline 28) the inner lip portion 80. The outer lip portion 82 extends circumferentially about (e.g., completely around) the axial centerline 28. The outer lip portion 82 may thereby have a full-hoop (e.g., tubular) geometry and circumscribe the inner lip portion 80.

The forward bulkhead 64 extends vertically from an inner end 88 of the forward bulkhead 64 to an outer end 90 of the forward bulkhead 64. The forward bulkhead 64 extends circumferentially about (e.g., completely around) the axial centerline 28. The forward bulkhead 64 may thereby have a full-hoop (e.g., annular) geometry. The forward bulkhead 64 of FIG. 2 includes an inner flange 92 and a base 94. The forward bulkhead inner flange 92 is disposed at the forward bulkhead inner end 88. The forward bulkhead inner flange 92 of FIG. 2 projects axially out from the forward bulkhead base 94 (in an axial aft direction along the axial centerline 28) to an axial distal end of the forward bulkhead inner flange 92. The forward bulkhead base 94 of FIG. 2 projects radially outwards away from the axial centerline 28 and (e.g., slightly) axially along the axial centerline 28 from the forward bulkhead inner end 88 to the forward bulkhead outer end 90. The forward bulkhead 64 and its forward bulkhead base 94 have a canted configuration where the forward bulkhead 64 and its forward bulkhead base 94 are angularly offset from the axial centerline 28 by a forward bulkhead offset angle 96. This forward bulkhead offset angle 96 may be a non-zero acute angle which is less than ninety degrees (90°) and equal to or greater than seventy degrees (70°). The forward bulkhead base 94 of FIG. 2, for example, has a frustoconical geometry which radially tapers inward as the forward bulkhead 64 extends axially (in an axial forward direction along the axial centerline 28) from (or about) the forward bulkhead outer end 90 to (or about) the forward bulkhead inner end 88 and the forward bulkhead inner flange 92. The present disclosure, however, is not limited to such an exemplary arrangement. The forward bulkhead 64, for example, may alternatively be arranged perpendicular to the axial centerline 28 in other embodiments.

The forward bulkhead inner flange 92 may be fixedly attached to the inner barrel 58. The forward bulkhead inner flange 92 of FIG. 2, for example, is bonded to (e.g., welded to, adhered to, consolidated with, etc.) an outer side of the inner barrel 58 at the inner barrel forward end 68. The forward bulkhead base 94 may be (e.g., removably) mechanically attached to the inlet lip 62 at the forward bulkhead inner end 88 and/or the forward bulkhead outer end 90 as described below in further detail. With this arrangement, the inlet structure 34 includes a forward internal cavity 98 ("forward cavity"). This forward cavity 98 extends radially within the inlet lip 62 from the inner lip portion 80 to the outer lip portion 82. The forward cavity 98 extends axially along the axial centerline 28 between the inlet lip 62 and the forward bulkhead 64. More particularly, the forward cavity 98 extends axially from a forward side of the forward bulkhead 64 to the inner lip portion 80 and the outer lip portion 82 at the intersection 84 between those lip portions 80 and 82. The forward cavity 98 extends circumferentially about (e.g., completely around) the axial centerline 28. The forward cavity 98 may thereby have a full-hoop (e.g., annular) geometry within the inlet structure 34.

The aft bulkhead 66 extends vertically from an inner end 100 of the aft bulkhead 66 to an outer end 102 of the aft bulkhead 66. The aft bulkhead 66 extends circumferentially about (e.g., completely around) the axial centerline 28. The aft bulkhead 66 may thereby have a full-hoop (e.g., annular)

geometry. The aft bulkhead 66 of FIG. 2 projects radially outwards away from the axial centerline 28 and axially along the axial centerline 28 from the aft bulkhead inner end 100 to the aft bulkhead outer end 102. The aft bulkhead 66 has a canted configuration where the aft bulkhead 66 is angularly offset from the axial centerline 28 by an aft bulkhead offset angle 104. This aft bulkhead offset angle 104 may be a non-zero acute angle which is less than ninety degrees (90°) and equal to or greater than seventy degrees (70°). The aft bulkhead 66 of FIG. 2, for example, has a frustoconical geometry which radially tapers inward as the aft bulkhead 66 extends axially (in the axial aft direction along the axial centerline 28) from (or about) the aft bulkhead outer end 102 to (or about) the aft bulkhead inner end 100. The present disclosure, however, is not limited to such an exemplary arrangement. The aft bulkhead 66, for example, may alternatively be arranged perpendicular to the axial centerline 28 in other embodiments.

At the aft bulkhead inner end 100, the aft bulkhead 66 is attached to the inner barrel 58 through, for example, an inner mounting structure 106; e.g., a bulkhead attach ring. At the aft bulkhead outer end 102, the aft bulkhead 66 may be (e.g., removably) mechanically attached to the outer barrel 60 as described below in further detail. With this arrangement, the inlet structure 34 includes an aft internal cavity 108 ("aft cavity"). This aft cavity 108 extends radially within the inlet structure 34 from the inner barrel 58 to the outer barrel 60 and, for example, further to one or more of the bulkheads 64 and 66. The aft cavity 108 extends axially along the axial centerline 28 from the forward bulkhead 64 to the aft bulkhead 66. The aft cavity 108 extends circumferentially about (e.g., completely around) the axial centerline 28. The aft cavity 108 may thereby have a full-hoop (e.g., annular) geometry within the inlet structure 34.

Figure 3:
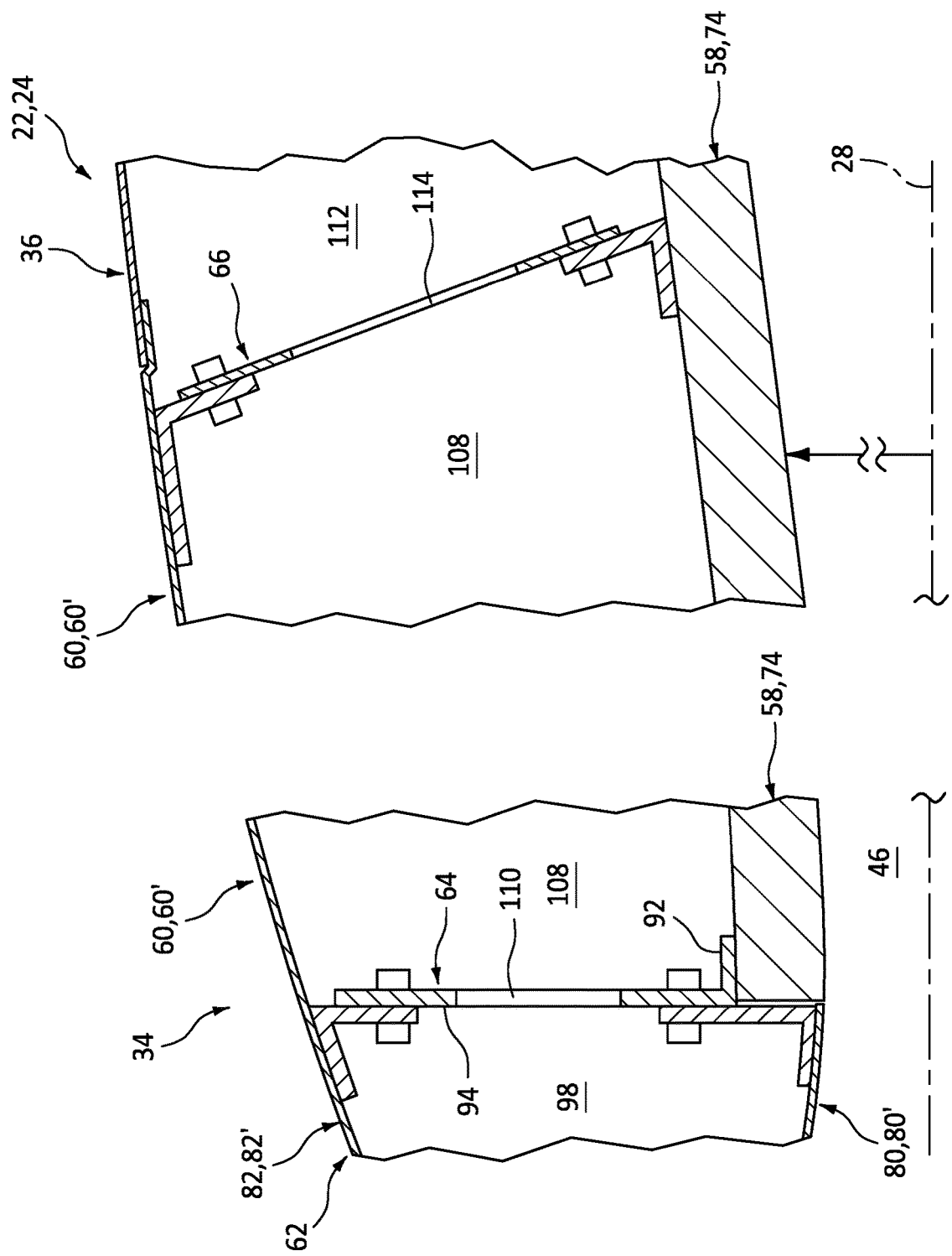
FIG. 3 is a partial, broken sectional illustration of the nacelle inlet structure at another circumferential location.

Referring to FIG. 3, the aft cavity 108 may (or may not) be fluidly coupled with the forward cavity 98 through one or more ports 110 (e.g., access windows, etc.) in the forward bulkhead 64 and its forward bulkhead base 94. The aft cavity 108 may (or may not) also or alternatively be fluidly coupled with an internal compartment 112 between the fan case 44 (see FIG. 2) and each fan cowl 36 through one or more ports 114 (e.g., access windows, etc.) in the aft bulkhead 66.

Figure 4:
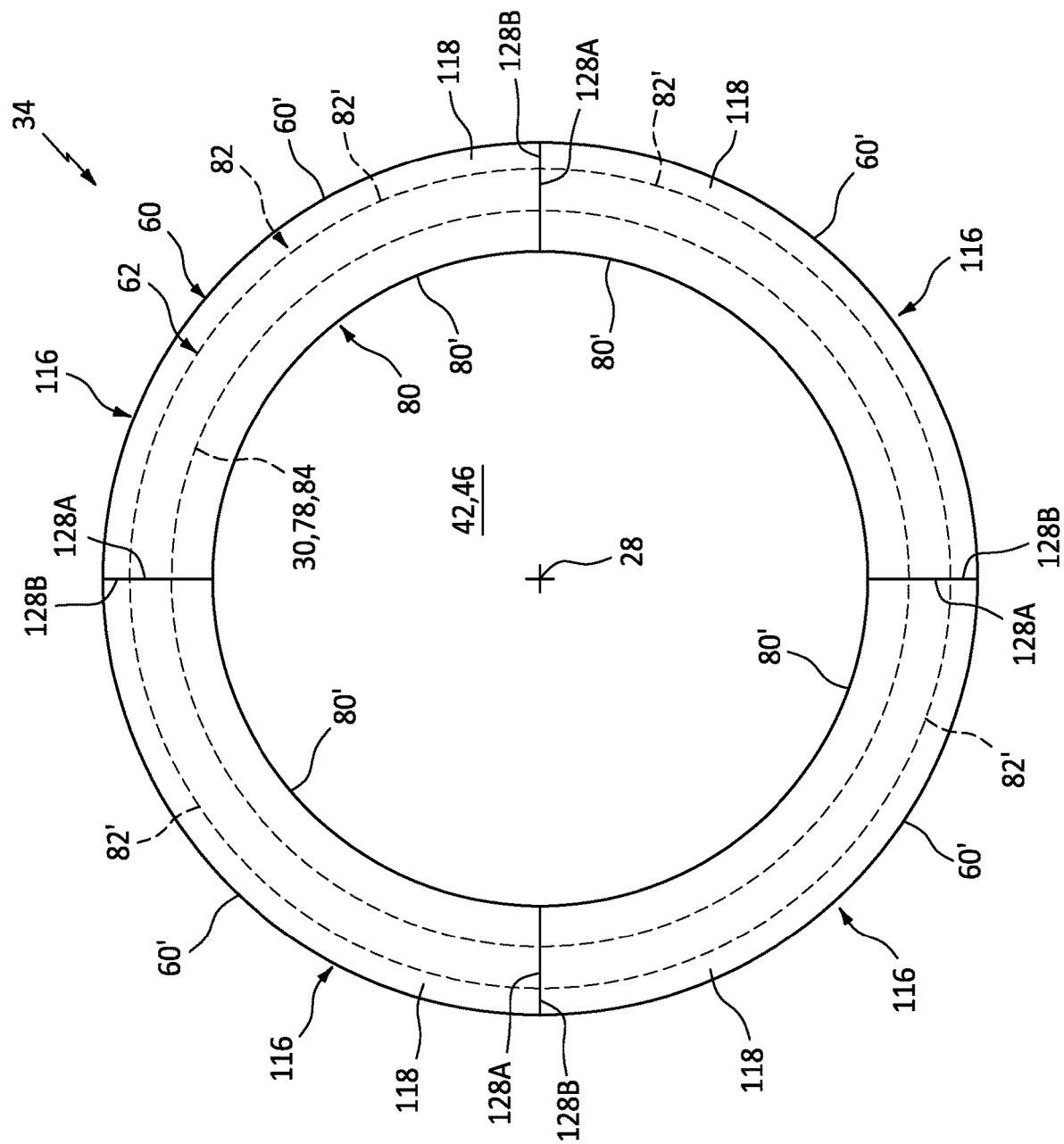
FIG. 4 is an end view illustration of the nacelle inlet structure.

Referring to FIG. 4, the inlet structure 34 includes a plurality of discrete circumferential inlet structure segments 116. These structure segments 116 are arranged circumferentially side-by-side around the axial centerline 28 in an array to collectively form one or more members of the inlet structure 34; e.g., the inlet lip 62 and the outer barrel 60 (see FIG. 2). Note, while the inlet structure 34 is shown with four (4) of the structure segments 116 in FIG. 4, the inlet structure 34 may alternatively include less than or more than four (4) of the structure segments 116 in other embodiments; e.g., two (2) or three (3) of the structure segments 116, five (5) or six (6) of the structure segments 116, etc. Referring to FIG. 2, one or more or all of the structure segments 116 each include a segment exterior skin 118, one or more segment mounts 120, 122 and 124 and an electric heater 126.

The exterior skin 118 may be configured as a relatively thin sheet or layer of continuous and uninterrupted material; e.g., non-perforated material. This exterior skin material may be constructed from metal; e.g., sheet metal. Examples of the metal include, but are not limited to, aluminum (Al) or an aluminum alloy, and titanium (Ti) and a titanium alloy. Alternatively, the exterior skin material may be constructed from a composite material; e.g., fiber-reinforced composite material. The exterior skin material, for example, may include a polymer (e.g., thermoplastic or thermoset) matrix and fiber-reinforcement (e.g., carbon fibers, fiberglass fibers, aramid fibers, etc.) embedded within the polymer matrix.

The exterior skin 118 may form a (e.g., entire) circumferential section of the inlet lip 62 and its inner lip portion 80 and its outer lip portion 82. The exterior skin 118 may also form a (e.g., entire) circumferential section of the outer barrel 60. Each exterior skin 118 of FIG. 4, for example, extends circumferentially about the axial centerline 28 between and to opposing circumferential sides 128A and 128B (generally referred to as "128") of the respective structure segment 116. The exterior skin 118 of FIG. 2 extends longitudinally from a longitudinal inner end 130 of the exterior skin 118 to a longitudinal outer end 132 of the exterior skin 118. The skin inner end 130 may be located at and/or form a circumferential section of the inlet lip inner aft end 86. The skin outer end 132 (or a portion of the exterior skin 118 nearby) may be located at and/or form a circumferential section of the outer barrel aft end 76. Here, the skin inner end 130 is disposed axially forward of the skin outer end 132 along the axial centerline 28. With this arrangement, the exterior skin 118 includes an inner lip section 80', an outer lip section 82' and an outer barrel section 60'. The inner lip section 80' forms a (e.g., entire) respective circumferential section of the inner lip portion 80 of the inlet lip 62. The outer lip section 82' forms a (e.g., entire) respective circumferential section of the outer lip portion 82 of the inlet lip 62. The outer barrel section 60' forms a (e.g., entire) respective circumferential section of the outer barrel 60.

Figure 5:
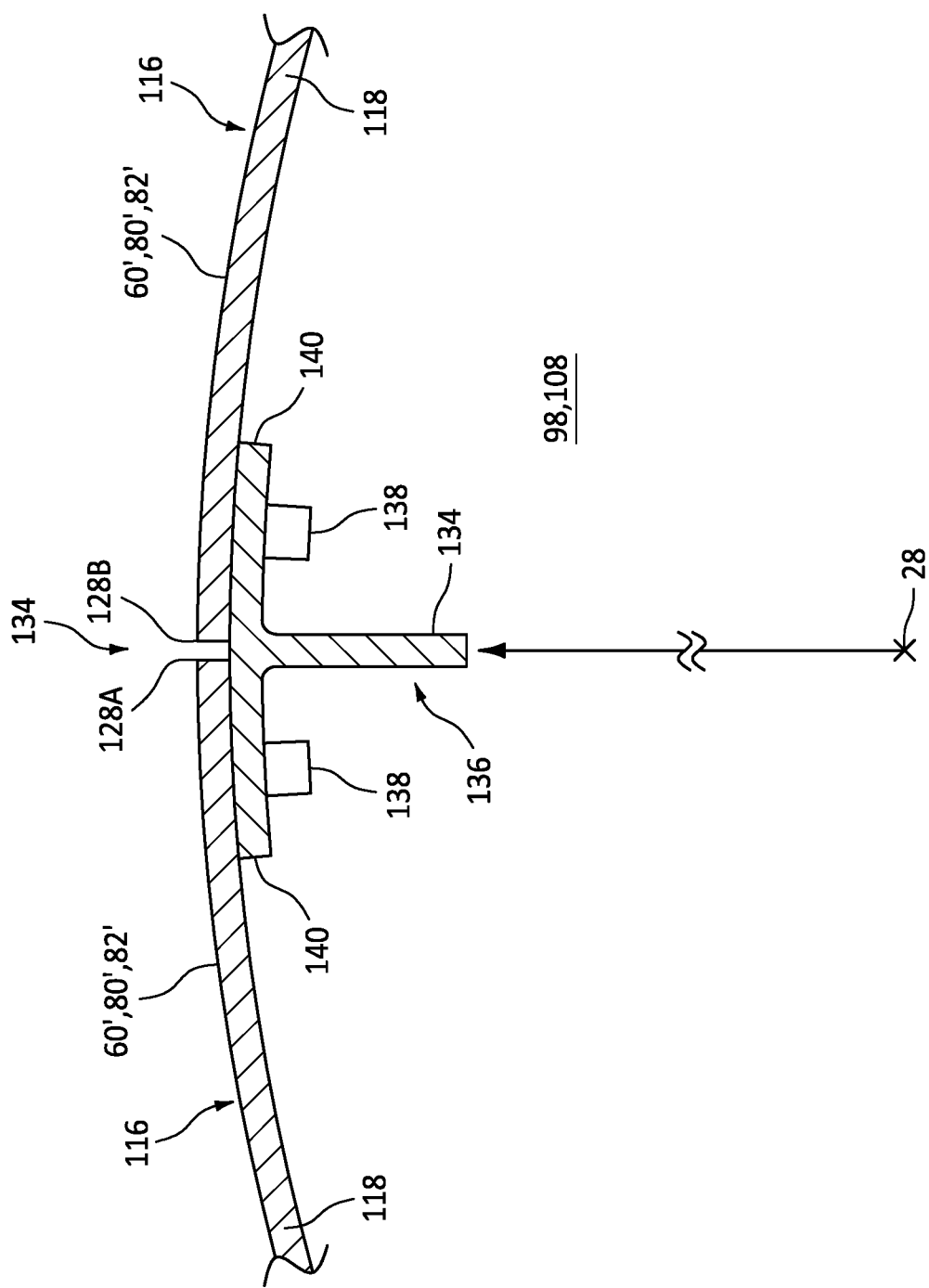
FIG. 5 is a partial cross-sectional illustration of the nacelle inlet structure at an interface between neighboring circumferential segments.

Referring to FIG. 5, at each segment side 128, each exterior skin 118 is disposed circumferentially next to a circumferentially neighboring (e.g., adjacent) exterior skin 118 at an inter-skin interface 134; e.g., a seam. At this inter-skin interface 134, the respective exterior skins 118 may be circumferentially engaged with (e.g., contact one another, abut against one another) or may be slightly circumferentially spaced from one another. Also at the inter-skin interface 134, the respective exterior skins 118 may be attached to one another through an axially extending coupler 136. More particularly, each exterior skin 118 may be (e.g., removably) mechanically attached to the respective coupler 136 by, for example, one or more fasteners 138; e.g., bolts, rivets, etc. Each fastener 138, for example, may project (e.g., radially) through the respective exterior skin 118 and a respective flange 140 of the coupler 136.

Figure 6:
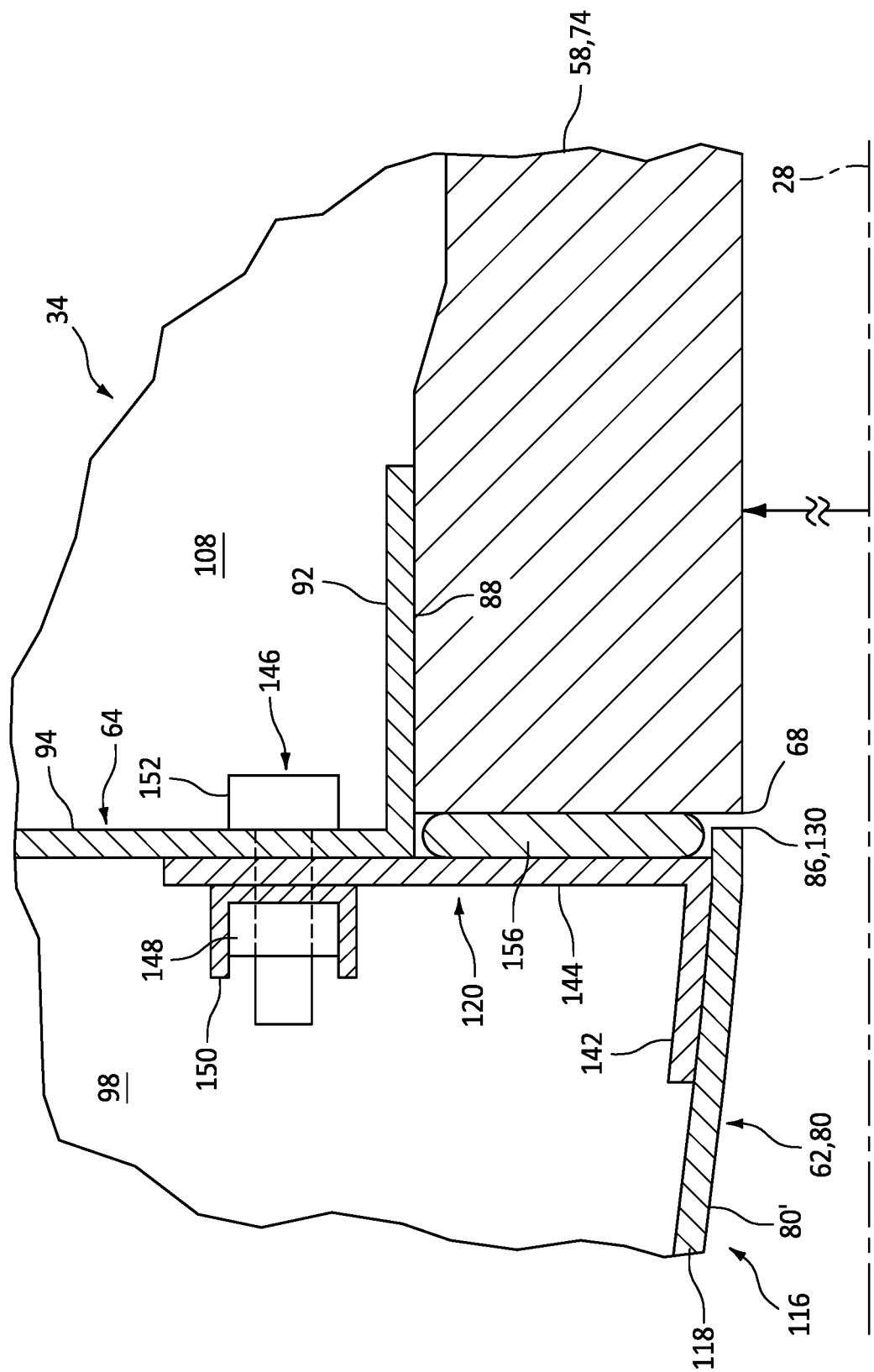
FIGS. 6-8 are partial sectional illustrations of various inner fastening arrangements between an inlet lip, an inner barrel and a forward bulkhead.

Referring to FIG. 6, the inner segment mount 120 is disposed within/along the forward cavity 98. This inner segment mount 120 is connected to the exterior skin 118. The inner segment mount 120 of FIG. 6, for example, includes an inner mount base 142 and an inner mount flange 144. The inner mount base 142 is bonded to (e.g., welded to, adhered to, consolidated with, etc.) the respective exterior skin 118 at the skin inner end 130. The inner mount flange 144 is disposed at the skin inner end 130. The inner mount flange 144 projects radially (in the radial outward direction away from the axial centerline 28) out from the inner mount base 142 to an outer distal end of the inner segment mount 120 and its inner mount flange 144. The inner segment mount 120 and its inner mount flange 144 may be mechanically fastened to the forward bulkhead 64 and coupled to the inner barrel 58. The inner segment mount 120 of FIG. 6, for example, is removably attached to the forward bulkhead 64 and its forward bulkhead base 94 by a plurality of fasteners 146 (one visible in FIG. 6); e.g., bolts. Each fastener 146 of FIG. 6 is mated with and projects (e.g., axially) through a respective fastener aperture in the forward bulkhead base 94 and a respective fastener aperture in the inner mount flange 144. Here, each fastener 146 is threaded into a nut 148 of a nut plate 150 attached to a forward side of the inner mount flange 144. The inner mount flange 144 and the forward bulkhead base 94 may thereby be secured (e.g., clamped) axially between the respective nut 148 and a head 152 of the respective fastener 146. The present disclosure, however, is not limited to such an exemplary arrangement. For example, referring to FIG. 7, each fastener 146 may alternatively be configured as a pin 154 which projects (e.g., axially) through the fastener aperture in the inner mount flange 144. Each pin 154 may radially and/or circumferentially locate/secure the inner segment mount 120 to the forward bulkhead 64 and/or the inner barrel 58. However, the inner segment mount 120 may move unrestricted along the respective pin 154 to facilitate easier installation and/or removal of the structure segment 116.

Figure 7:
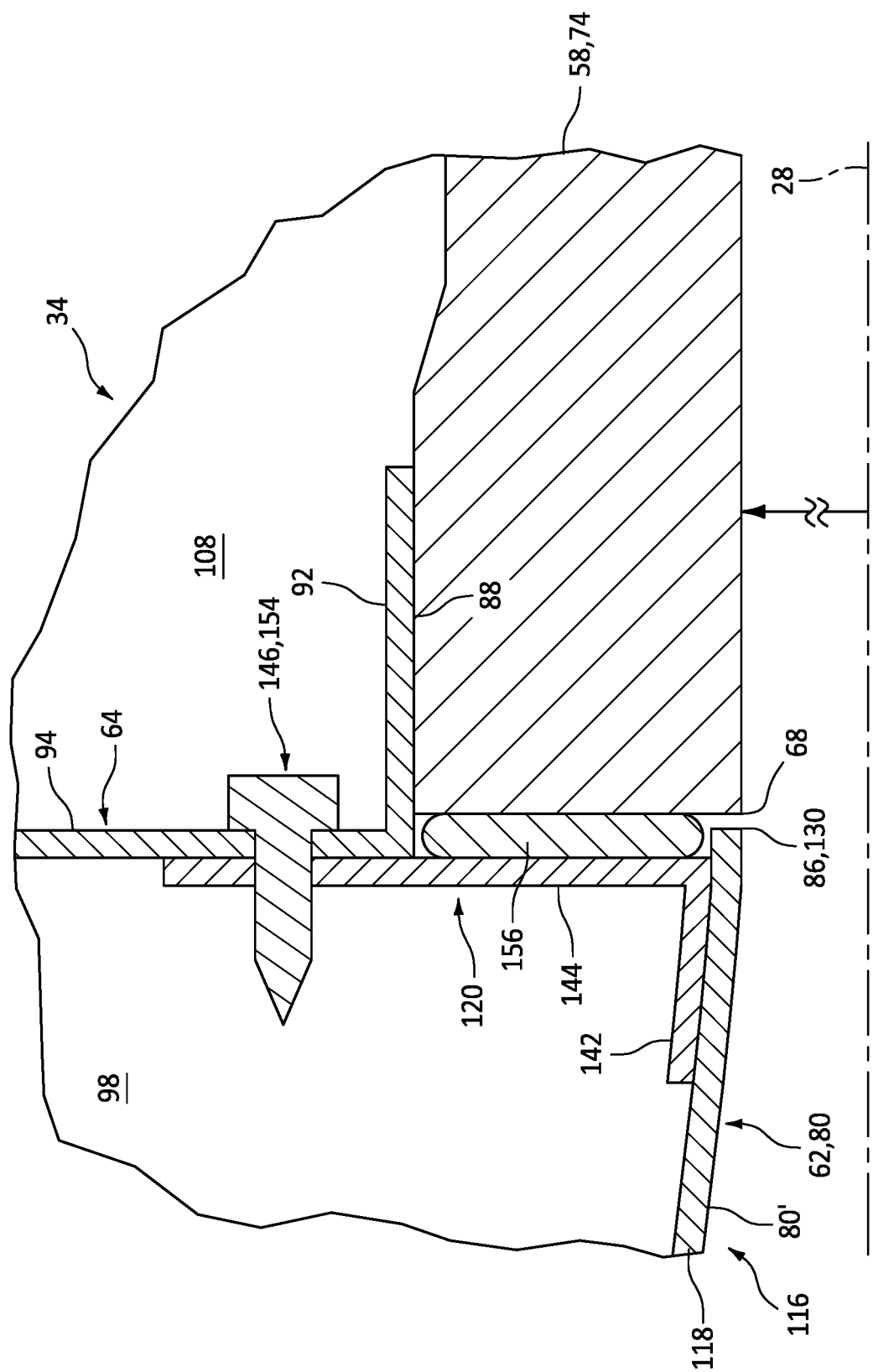

In some embodiments, referring to FIGS. 6 and 7, a seal element 156 may be included to seal a gap between the inner barrel 58 and the inlet lip 62. The seal element 156 of FIGS. 6 and 7, for example, is disposed axially between and engaged with each inner mount flange 144 and the inner barrel 58.

Figure 8:
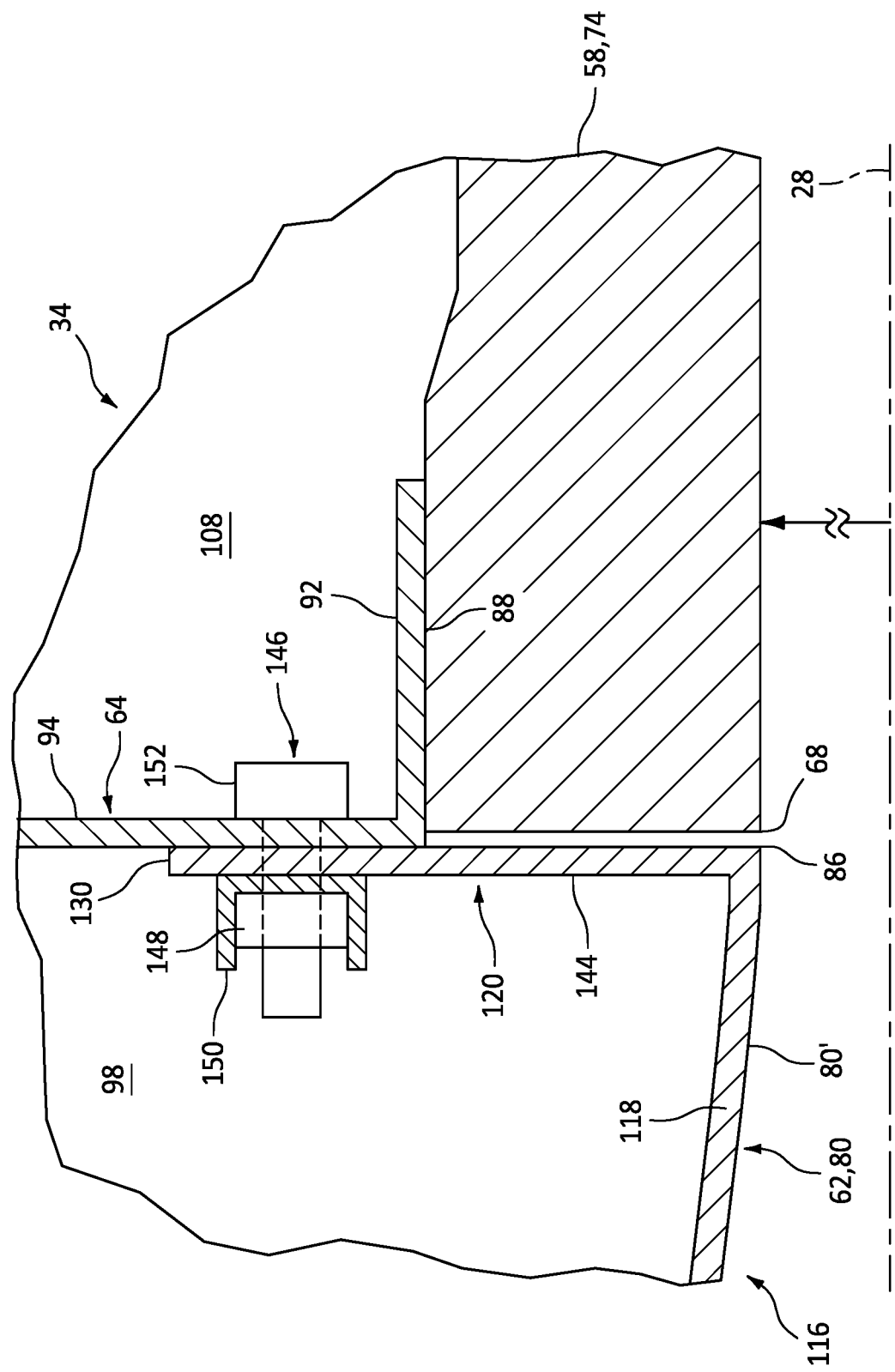

In some embodiments, referring to FIGS. 6 and 7, the inner segment mount 120 may be bonded to the exterior skin 118. In other embodiments, referring to FIG. 8, the inner segment mount 120 and its inner mount flange 144 may alternatively be formed integral with the exterior skin 118. The exterior skin 118 and the inner mount flange 144 of FIG. 8, for example, are formed from a common layer of material which is bent radially outward at the inlet lip inner aft end 86 to form the inner mount flange 144.

Figure 9:
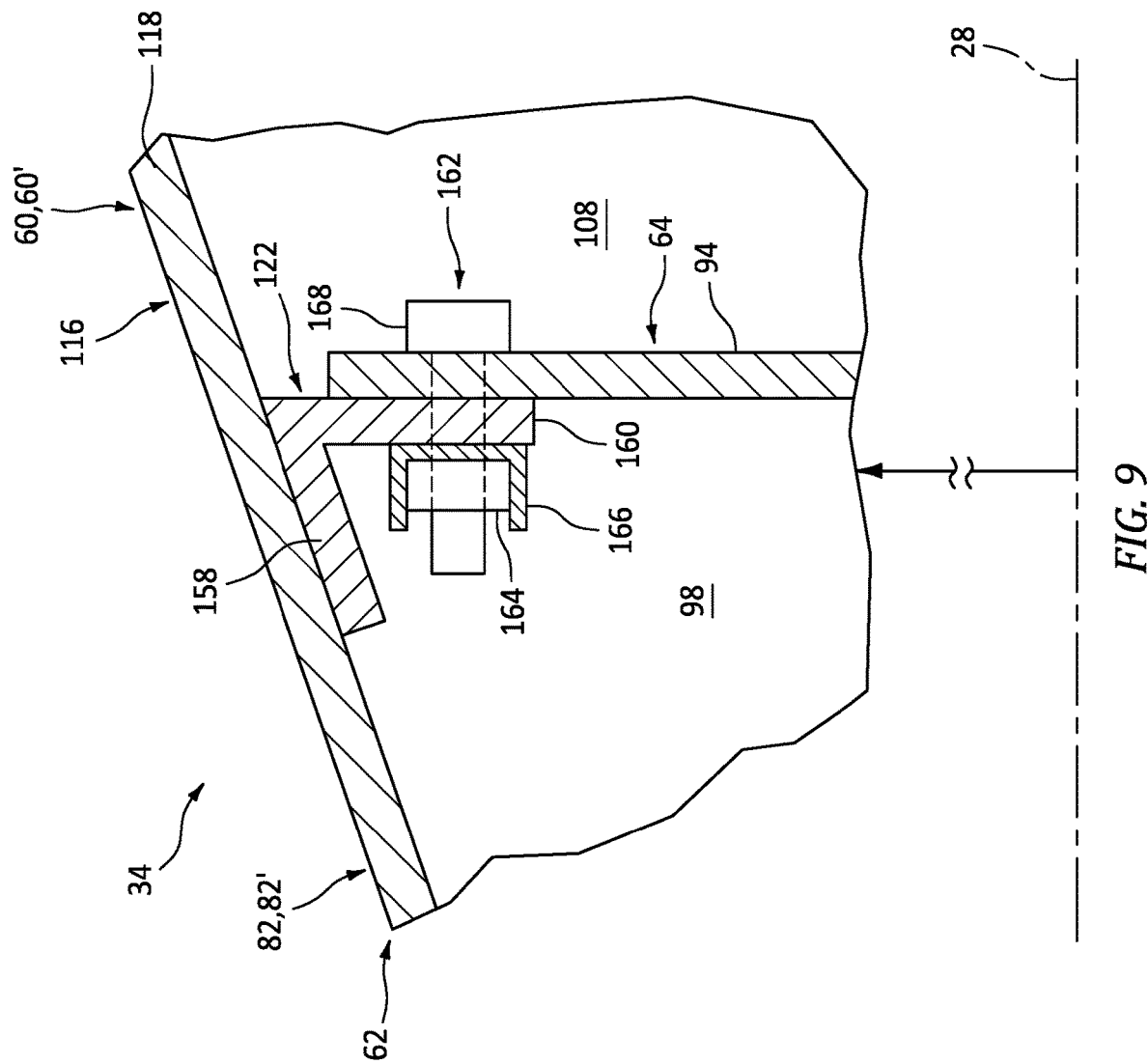
FIG. 9 is a partial sectional illustration of an outer fastening arrangement between the inlet lip and the forward bulkhead.

Referring to FIG. 9, the forward outer segment mount ("forward segment mount") is disposed within/along the forward cavity 98. This forward segment mount 122 is connected to the exterior skin 118. The forward segment mount 122 of FIG. 9, for example, includes a forward outer mount base 158 ("forward mount base") and a forward outer mount flange 160 ("forward mount flange"). The forward mount base 158 may be bonded to (e.g., welded to, adhered to, consolidated with, etc.) the respective exterior skin 118 at a longitudinally intermediate location between the skin inner end 130 and the skin outer end 132 (see FIG. 2). The intermediate location of FIG. 9, for example, is disposed at (or near) an intersection between the respective outer lip section 82' and the respective outer barrel section 60'. The forward mount base 158 of FIG. 9, for example, is bonded to the respective exterior skin 118 (e.g., only) along the respective outer lip section 82'. However, in other embodiments, the forward mount base 158 may be shifted aft and may be bonded to the respective exterior skin 118 (a) along both the respective outer lip section 82' and the respective outer barrel section 60' or (b) (e.g., only) along the respective outer barrel section 60'. The forward mount flange 160 of FIG. 9 is disposed at an aft end of the forward mount base 158. The forward mount flange 160 projects radially (in a radial inward direction towards the axial centerline 28) out from the forward mount base 158 to an inner distal end of the forward segment mount 122 and its forward mount flange 160. The forward segment mount 122 and its forward mount flange 160 may be mechanically fastened to the forward bulkhead 64. The forward segment mount 122 of FIG. 9, for example, is removably attached to the forward bulkhead 64 and its forward bulkhead base 94 by a plurality of fasteners 162 (one visible in FIG. 9); e.g., bolts. Each fastener 162 of FIG. 9 is mated with and projects (e.g., axially) through a respective fastener aperture in the forward bulkhead base 94 and a respective fastener aperture in the forward mount flange 160. Here, each fastener 162 is threaded into a nut 164 of a nut plate 166 attached to a forward side of the forward mount flange 160. The forward mount flange 160 and the forward bulkhead base 94 may thereby be secured (e.g., clamped) axially between the respective nut 164 and a head 168 of the respective fastener 162. The present disclosure, however, is not limited to such an exemplary arrangement.

Figure 10:
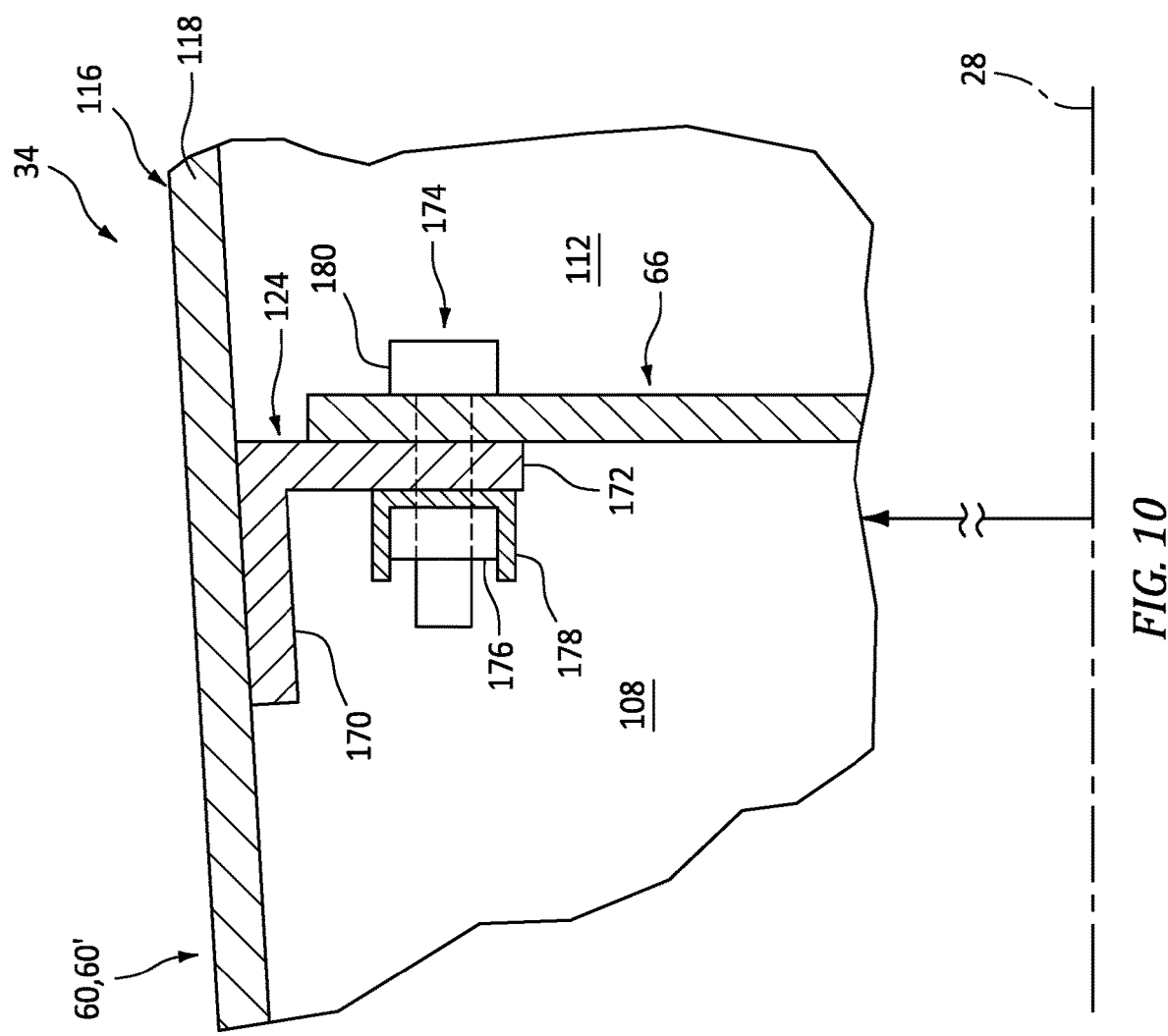
FIGS. 10 and 11 are partial sectional illustrations of various outer fastening arrangements between an outer barrel and an aft bulkhead.

Referring to FIG. 10, the aft outer segment mount ("aft segment mount") is disposed within/along the aft cavity 108. This aft segment mount 124 is connected to the exterior skin 118. The aft segment mount 124 of FIG. 10, for example, includes an aft outer mount base 170 ("aft mount base") and an aft outer mount flange 172 ("aft mount flange"). The aft mount base 170 may be bonded to (e.g., welded to, adhered to, consolidated with, etc.) the respective exterior skin 118 at (or near) the skin outer end 132 (see FIG. 2). The aft mount base 170 of FIG. 10, for example, is bonded to the respective exterior skin 118 (e.g., only) along the respective outer barrel section 60'. The aft mount flange 172 of FIG. 10 is disposed at an aft end of the aft mount base 170. The aft mount flange 172 projects radially (in the radial inward direction towards the axial centerline 28) out from the aft mount base 170 to an inner distal end of the aft segment mount 124 and its aft mount flange 172. The aft segment mount 124 and its aft mount flange 172 may be mechanically fastened to the aft bulkhead 66. The aft segment mount 124 of FIG. 10, for example, is removably attached to the aft bulkhead 66 by a plurality of fasteners 174 (one visible in FIG. 10); e.g., bolts. Each fastener 174 of FIG. 10 is mated with and projects (e.g., axially) through a respective fastener aperture in the aft bulkhead 66 and a respective fastener aperture in the aft mount flange 172. Here, each fastener 174 is threaded into a nut 176 of a nut plate 178 attached to a forward side of the aft mount flange 172. The aft mount flange 172 and the aft bulkhead 66 may thereby be secured (e.g., clamped) axially between the respective nut 176 and a head 180 of the respective fastener 174. The present disclosure, however, is not limited to such an exemplary arrangement.

Figure 11:
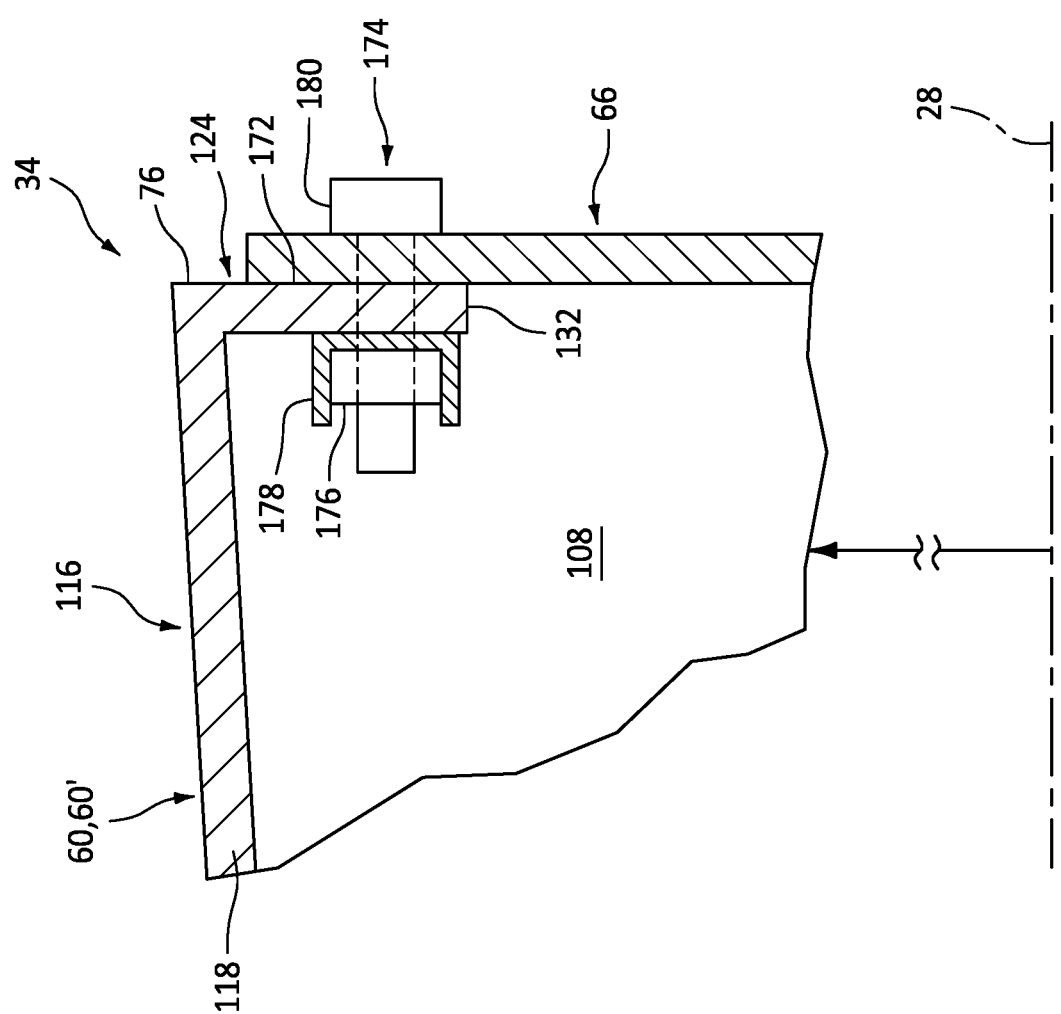

In some embodiments, referring to FIG. 10, the aft segment mount 124 may be bonded to the exterior skin 118. In other embodiments, referring to FIG. 11, the aft segment mount 124 and its aft mount flange 172 may alternatively be formed integral with the exterior skin 118. The exterior skin 118 and the aft mount flange 172 of FIG. 11, for example, are formed from a common layer of material which is bent radially inward at the outer barrel aft end 76 to form the aft mount flange 172.

Figure 12A:
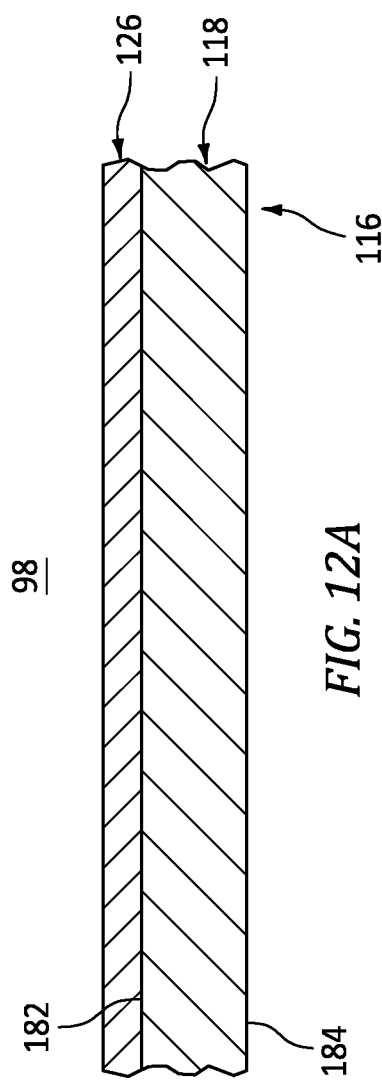
FIGS. 12A and 12B are partial schematic sectional illustrations of various skin-electric heater arrangements.
Figure 12B:
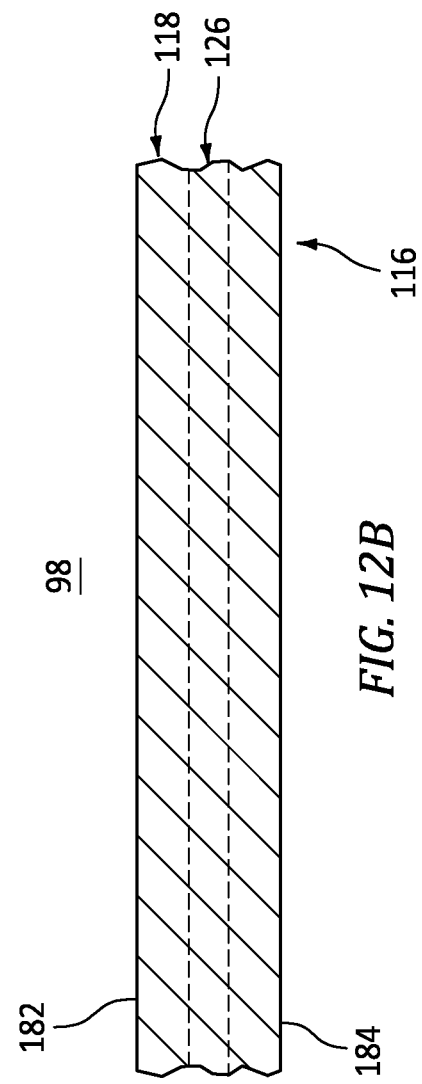

Referring to FIG. 2, the electric heater 126 is arranged with the exterior skin 118. The electric heater 126 of FIG. 2, for example, may extend longitudinally along at least a portion or an entirety of the inner lip section 80' and/or at least a portion or an entirety of the outer lip section 82'. Each electric heater 126 may extend circumferentially about the axial centerline 28 between and to (or about) the opposing segment sides 128 (see FIG. 4). In some embodiments, referring to FIG. 12A, the electric heater 126 may be disposed within/along the forward cavity 98. The electric heater 126, for example, may be bonded to or otherwise attached to an interior surface 182 of the exterior skin 118. In other embodiments, referring to FIG. 12B, the electric heater 126 may be integrated into the exterior skin 118. The electric heater 126, for example, may be embedded or otherwise incorporated into the exterior skin material and, thus, between the exterior skin interior surface 182 and an exterior surface 184 of the exterior skin 118.

Referring to FIG. 2, the anti-icing system 56 includes the electric heater 126 that is part of/integrated with each structure segment 116. The anti-icing system 56 also includes a controller 186 and an electrical power source 188; e.g., one or more batteries, an electric generator, etc. This anti-icing system 56 is configured to melt and/or prevent ice accumulation on each exterior skin 118 and its exterior surface 184, for example, at, along and near the leading edge 78. The controller 186, for example, may signal the power source 188 (or a switch and/or other regulator between the power source 188 and each electric heater 126) to provide electricity to each electric heater 126. The electricity energizers each electric heater 126 and its heating elements, and each electric heater 126 generates heat energy. The heat energy transfers (e.g., conducts) through the exterior skin material towards (e.g., to) the respective exterior skin exterior surface 184 (e.g., an exterior aerodynamic surface of the inlet structure 34) thereby heating that exterior skin exterior surface 184 to an elevated temperature. This elevated temperature may be selected to be warm enough to melt any ice accumulating on the respective exterior skin exterior surface 184 and/or prevent accumulation of the ice on the respective exterior skin exterior surface 184, while cool enough so as not to damage the respective exterior skin 118 (e.g., when made from the composite material) or any surrounding components and/or needlessly expend energy.

During propulsion system operation, the inlet structure 34 and one or more of its exterior skins 118 may be damaged (e.g., dented, fractured, etc.) when impacted by a foreign object; e.g., a relatively large bird. The inlet structure arrangement of the present disclosure is configured to facilitate relatively easy and/or fast repairs of the inlet structure 34 following such damage. Each damaged exterior skin 118, for example, may be unfastened and individually removed from the inlet structure 34 without requiring, for example, additional removal of adjacent (e.g., undamaged) exterior skins 118. In addition to facilitating relatively easy and/or fast repairs, costs associated with such repairs may also be reduced since only a portion (e.g., one or two of the exterior skins 118) of the inlet structure 34 may need to be repaired/replaced.

In some embodiments, referring to FIG. 2, the outer barrel 60 is collectively formed by the exterior skin 118. In other embodiments, referring to FIG. 13, the outer barrel 60 may be configured discrete from the inlet lip 62 and its outer lip portion 82. With such an arrangement, each exterior skin 118 forms the respective inner lip section 80' and the respective outer lip section 82', and is discrete from a skin 190 of the outer barrel 60. Here, each exterior skin 118 and the outer barrel skin 190 are (e.g., discretely) attached to and supported by the forward bulkhead 64.

In some embodiments, referring to FIG. 2, one or more of the exterior skins 118 may each form a circumferential segment of a landing 192 for a respective one of the fan cowls 36. A portion of the exterior skin 118 of FIG. 2, for example, projects axially aft from the aft bulkhead 66 and the outer barrel section 60'. The fan cowl 36 of FIG. 2 is radially outboard of and axially overlaps the landing 192. The fan cowl 36 of FIG. 2 may thereby radially engage (e.g., contact) and rest against the landing 192. In other embodiments, however, the landing 192 may be discrete from the exterior skins 118.

Figure 14:
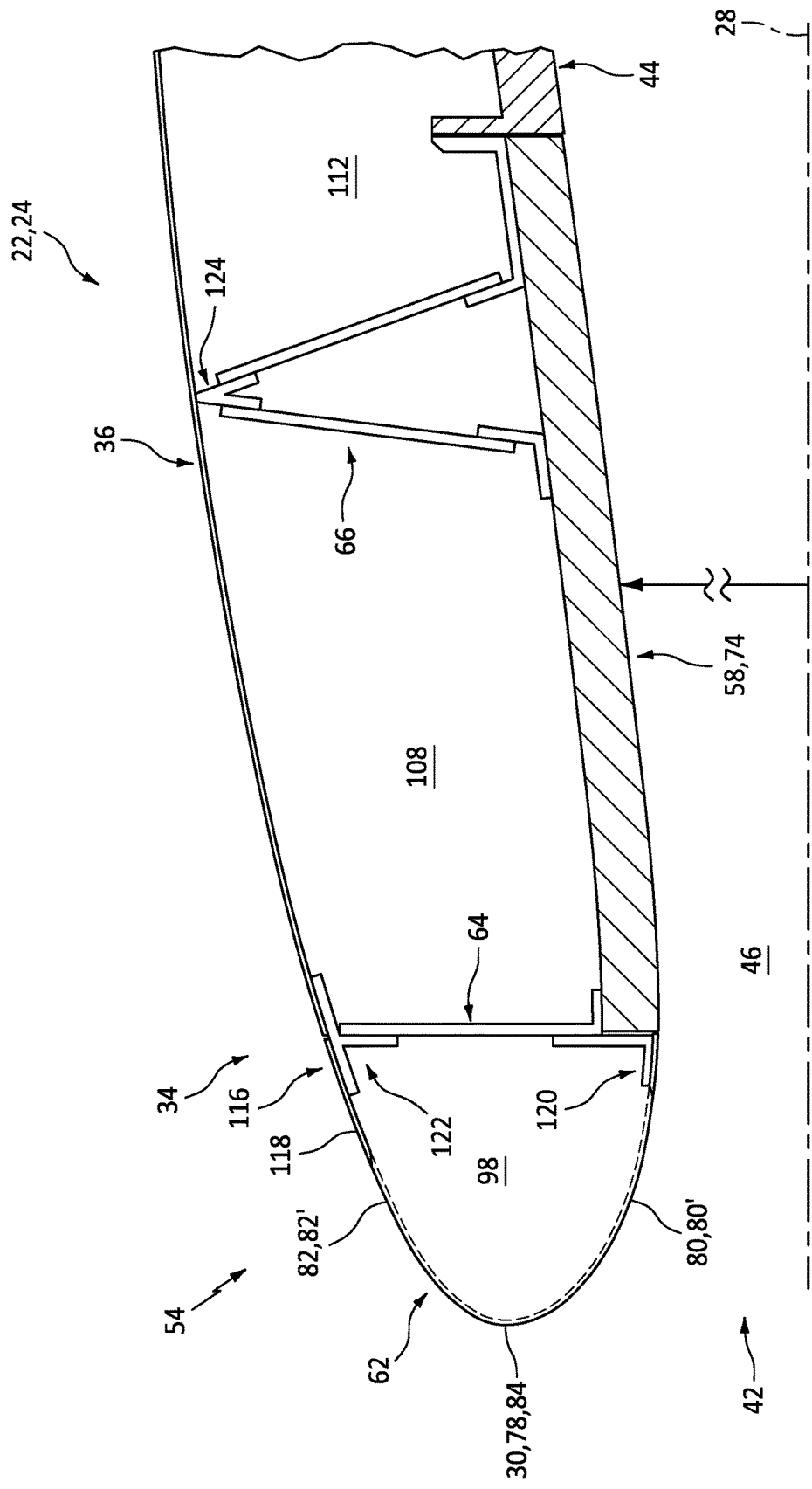

In some embodiments, referring to FIG. 14, the inlet structure 34 may be configured without the outer barrel 60 (see FIG. 2). With such an arrangement, each fan cowl 36 may be extended further axially forward along the axial centerline 28. Each fan cowl 36 of FIG. 14, for example, is radially outboard and axially overlaps each of the bulkheads 64 and 66. Each fan cowl 36 of FIG. 14 may thereby radially engage (e.g., contact) and rest against each of the bulkheads 64 and 66. Moreover, while the arrangement of FIG. 14 is described with respect to the anti-icing system 56 with the electric heaters 126, it is contemplated the arrangement of FIG. 14 may alternatively be utilized with a traditional hot air anti-icing system.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a nacelle inlet structure extending axially along and circumferentially around a centerline, the nacelle inlet structure including an inlet lip, an inner barrel, an outer barrel, a bulkhead and a plurality of structure segments;
    the inlet lip forming a leading edge of the nacelle inlet structure;
    the inner barrel projecting axially aft away from an inner aft end of the inlet lip;
    a gap disposed between the inner aft end and the inner barrel;
    the outer barrel projecting axially aft away from the inlet lip, and the outer barrel radially outboard of and axially overlapping the inner barrel;
    the bulkhead connected to the inner barrel;
    each of the plurality of structure segments including an exterior skin, an inner mount flange, an outer mount flange and an electric heater configured to heat the exterior skin;
    the exterior skin forming at least a respective circumferential section of the inlet lip;
    the inner mount flange connected to and projecting radially outward away from the exterior skin, wherein an inner fastener extends axially through the inner mount flange and couples the inner mount flange to the inner barrel; and
    the outer mount flange connected to and projecting radially inward away from the exterior skin, wherein an outer fastener extends axially through the outer mount flange and couples the outer mount flange to the bulkhead.

2. The assembly of claim 1, wherein the plurality of structure segments are arranged circumferentially side-by-side around the centerline in an array to collectively form the inlet lip.

3. The assembly of claim 1, wherein the exterior skin further forms a respective circumferential section of the outer barrel.

4. The assembly of claim 1, wherein
    the inner fastener comprises a bolt threaded into a nut; and
    the inner mount flange is secured axially between the nut and a head of the bolt.

5. The assembly of claim 1, wherein the inner fastener comprises a pin projecting axially through a fastener aperture in the inner mount flange.

6. The assembly of claim 1, wherein the inner fastener projects axially out from a mount for the inner barrel and extends axially through a fastener aperture in the inner mount flange.

7. The assembly of claim 1, wherein the inner fastener projects axially out from the bulkhead and extends axially through a fastener aperture in the inner mount flange.

8. The assembly of claim 1, wherein the inner mount flange is formed integral with the exterior skin.

9. The assembly of claim 1, wherein
an inner mount comprises the inner mount flange; and
the inner mount is bonded to the exterior skin.

10. The assembly of claim 1, wherein
the outer fastener comprises a bolt threaded into a nut; and
the outer mount flange is secured axially between the nut and a head of the bolt.

11. The assembly of claim 1, wherein the outer fastener projects axially out from the bulkhead and extends axially through a fastener aperture in the outer mount flange.

12. The assembly of claim 1, wherein the outer mount flange is formed integral with the exterior skin.

13. The assembly of claim 1, wherein
an outer mount comprises the outer mount flange; and
the outer mount is bonded to the exterior skin.

14. The assembly of claim 1, wherein
the bulkhead is a forward bulkhead, the inner fastener further extends axially through the forward bulkhead, and the nacelle inlet structure further includes an aft bulkhead connected to the inner barrel;
the outer mount flange is a forward outer mount flange, and each of the plurality of structure segments further includes an aft outer mount flange connected to and projecting radially inward away from the exterior skin; and
the outer fastener is a forward outer fastener, and an aft outer fastener extends axially through the aft outer mount flange and couples the aft outer mount flange to the aft bulkhead.

15. The assembly of claim 1, further comprising a fan cowl axially overlapping and radially engaging the bulkhead.

16. The assembly of claim 15, wherein
the bulkhead is a forward bulkhead, and the nacelle inlet structure further includes an aft bulkhead connected to the inner barrel; and
the fan cowl axially overlaps and radially engages the aft bulkhead.

17. An assembly for an aircraft propulsion system, comprising:
a nacelle inlet structure extending axially along and circumferentially around a centerline, the nacelle inlet structure including an inlet lip, an inner barrel, an outer barrel, a bulkhead and a plurality of structure segments;
the inlet lip forming a leading edge of the nacelle inlet structure;
the inner barrel projecting axially aft away from the inlet lip;
the outer barrel projecting axially aft away from the inlet lip, and the outer barrel radially outboard of and axially overlapping the inner barrel;
each of the plurality of structure segments including an exterior skin, an inner mount flange, an outer mount flange and an electric heater configured to heat the exterior skin;
the exterior skin forming at least a respective circumferential section of the inlet lip;
the inner mount flange connected to and projecting radially outward away from a skin inner end of the exterior skin, wherein an inner fastener extends axially through the inner mount flange and the bulkhead;
an axial gap formed between the inner barrel and the skin inner end; and
the outer mount flange connected to and projecting radially inward away from the exterior skin, wherein an outer fastener extends axially through the outer mount flange and the bulkhead.

18. The assembly of claim 17, wherein
the bulkhead is a forward bulkhead, and the nacelle inlet structure further includes an aft bulkhead connected to and projecting radially out away from the inner barrel;
the exterior skin further forms a respective circumferential section of the outer barrel; and
the outer mount flange is a forward outer mount flange, and each of the plurality of structure segments further includes an aft outer mount flange mechanically fastened to the aft bulkhead.

19. The assembly of claim 17, wherein an outer barrel fastener projects through the outer barrel and a flange of the bulkhead to mechanically fasten the outer barrel to the bulkhead.

20. An assembly for an aircraft propulsion system, comprising:
a nacelle inlet structure extending axially along and circumferentially around a centerline, the nacelle inlet structure including an inlet lip, an inner barrel, an outer barrel, a forward bulkhead, an aft bulkhead and a plurality of structure segments, the inner barrel projecting axially aft away from an inner aft end of the inlet lip, a forward end of the inner barrel axially spaced apart from the inner aft end of the inlet lip, the outer barrel projecting axially aft away from an outer lip portion of the inlet lip, the outer barrel radially outboard of and axially overlapping the inner barrel, the forward bulkhead connected to the inner barrel and the outer lip portion of the inlet lip, and the aft bulkhead connected to and projecting radially outward away from the inner barrel;
each of the plurality of structure segments including an exterior skin, an inner mount flange, an outer mount flange and an electric heater configured to heat the exterior skin;
the inner mount flange connected to and projecting radially outward away from a skin inner end of the exterior skin, wherein an inner fastener extends axially through the inner mount flange and the forward bulkhead; and
a fan cowl axially overlapping and radially engaging the forward bulkhead and the aft bulkhead.

* * * * *